(12) United States Patent
Ramesh et al.

(10) Patent No.: US 9,418,305 B1
(45) Date of Patent: Aug. 16, 2016

(54) SEGMENTATION FREE APPROACH TO AUTOMATIC LICENSE PLATE RECOGNITION

(71) Applicant: Xerox Corporation, Norwalk, CT (US)

(72) Inventors: Palghat S. Ramesh, Pittsford, NY (US); Vladimir Kozitsky, Rochester, NY (US); Aaron Michael Burry, Ontario, NY (US)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 14/699,289

(22) Filed: Apr. 29, 2015

(51) Int. Cl.
*G06K 9/00* (2006.01)
*G06K 9/32* (2006.01)
*G06K 9/78* (2006.01)

(52) U.S. Cl.
CPC ............ *G06K 9/3258* (2013.01); *G06K 9/3241* (2013.01); *G06K 9/78* (2013.01); *G06K 2209/01* (2013.01); *G06K 2209/15* (2013.01)

(58) Field of Classification Search
None
See application file for complete search history.

(56) References Cited

U.S. PATENT DOCUMENTS

| | | | | |
|---|---|---|---|---|
| 5,438,630 A | * | 8/1995 | Chen | G06K 9/00463 382/159 |
| 5,825,919 A | * | 10/1998 | Bloomberg | G06K 9/00463 382/171 |
| 5,912,986 A | * | 6/1999 | Shustorovich | G06K 9/32 382/156 |
| 6,028,956 A | * | 2/2000 | Shustorovich | G06K 9/3233 382/156 |
| 6,249,605 B1 | * | 6/2001 | Mao | G06K 9/00872 382/178 |
| 6,473,517 B1 | | 10/2002 | Tyan et al. | |
| 6,553,131 B1 | | 4/2003 | Neubauer et al. | |
| 6,594,393 B1 | * | 7/2003 | Minka | G06K 9/6297 382/218 |
| 7,076,102 B2 | | 7/2006 | Lin et al. | |

(Continued)

OTHER PUBLICATIONS

Guillevic et al ("HMM Word Recognition Engine", 1997).*

(Continued)

*Primary Examiner* — Avinash Yentrapati
(74) *Attorney, Agent, or Firm* — Kevin Soules; Kermit D. Lopez; Luis M. Ortiz

(57) ABSTRACT

A segmentation free method and system for automatic license plate recognition. An OCR classifier can be swept across an image of a license plate. Characters and their locations can be inferred with respect to the image of the license plate using probabilistic inference based on a Hidden Markov Model (HMM). A language model can be combined with a license plate candidate from the HMM to infer the optimal or best license plate code. The language model can be configured by employing a corpus of license plate codes, wherein the corpus includes a distribution representative of training sets and tests sets.

20 Claims, 13 Drawing Sheets

(56) References Cited

U.S. PATENT DOCUMENTS

| | | | |
|---|---|---|---|
| 7,107,254 B1* | 9/2006 | Dumais | G06N 7/005 706/12 |
| 8,136,154 B2 | 3/2012 | Phoha et al. | |
| 8,335,381 B2* | 12/2012 | Rodriguez Serrano | G06K 9/6279 382/156 |
| 8,432,449 B2 | 4/2013 | Chen et al. | |
| 8,447,112 B2 | 5/2013 | Paul et al. | |
| 8,644,561 B2 | 2/2014 | Burry et al. | |
| 2006/0193518 A1* | 8/2006 | Dong | G06K 9/00859 382/186 |
| 2009/0041354 A1* | 2/2009 | Liu | G06K 9/6297 382/187 |
| 2009/0060335 A1* | 3/2009 | Rodriguez Serrano | G06K 9/00194 382/177 |
| 2010/0008581 A1* | 1/2010 | Bressan | G06K 9/00859 382/177 |
| 2010/0145678 A1* | 6/2010 | Csomai | G06F 17/2755 704/9 |
| 2010/0153187 A1* | 6/2010 | Ghani | G06Q 30/02 705/14.53 |
| 2010/0169077 A1* | 7/2010 | Yang | G06K 9/344 704/9 |
| 2013/0272579 A1 | 10/2013 | Burry et al. | |
| 2013/0279758 A1* | 10/2013 | Burry | G06K 9/3258 382/105 |
| 2013/0294652 A1* | 11/2013 | Fan | G06K 9/3258 382/105 |
| 2014/0307924 A1 | 10/2014 | Fillion et al. | |
| 2014/0363052 A1* | 12/2014 | Kozitsky | G06K 9/00624 382/105 |
| 2015/0186756 A1* | 7/2015 | Fujii | G06K 9/72 382/229 |
| 2015/0269431 A1* | 9/2015 | Haji | G06K 9/00879 382/186 |

OTHER PUBLICATIONS

Anagnostopoulos, C.-N. E. et al., "License Plate Recognition From Still Images and Video Sequences: A Survey," IEEE Transactions on Intelligent Transportation Systems (2008) 9(3):377-391.

Casey, R. G. et al., "A Survey of Methods and Strategies in Character Segmentation," IEEE Transactions on Pattern Analysis and Machine Intelligence (1996) 18(7):690-706.

Jia, W. et al., "Segmenting Characters from License Plate Images with Little Prior Knowledge," 2010 Digital Image Computing: Techniques and Applications, Dec. 1-3, Sydney, NSW, pp. 220-226.

\* cited by examiner

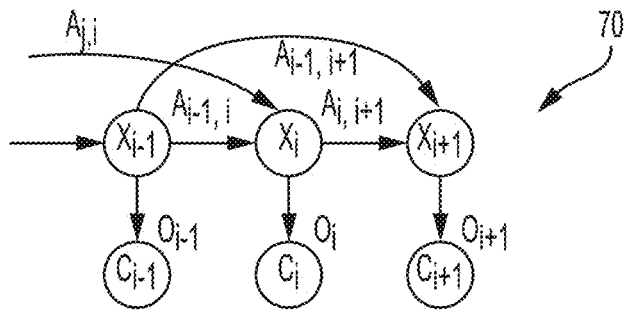

FIG. 7

- LET $\delta(i,j)$ BE THE PROBABILITY OF A PLATE CHARACTER SEQUENCE OF LENGTH $i$ WHOSE $i^{th}$ CHARACTER IS $C_j$.

```
Initialize: δ(i,j) =0,   γ(i,j) =0 for i,j=1..N
   for j=1 to N
      δ(1,j) =o(j)
      γ(1,j) =o(j)
   for i=2 to N
      for j = i to N
         k*=argmax_{k=1..j-1} δ(i-1,k) *A (k,j) *o(j)
         δ(i,j) = δ(i-1,k*) *A (k*,j) *o(j)
         γ(i,j) = Min ( γ(i-1,k*), A(k,*j) *o(j))
         back (i,j) = k* for i=1 to N
      j*=argmax_{j=1..N} δ(i,j)
      δ_max (i) = δ(i,j*)
      γ_max (i) = γ(i,j*)
      code (i) = backtrack (i,j*,back)
   L=argmax_i  γ_max (i) P_LM (code (i))
   return code (L)
```

FIG. 8

SEGMENTATION FREE APPROACH TO AUTOMATIC LICENSE PLATE RECOGNITION

TECHNICAL FIELD

Embodiments are generally related to the field of ALPR (Automated License Plate Recognition). Embodiments are additionally related to OCR (Optical Character Recognition) and image classification. Embodiments also relate to segmentation free image classification techniques.

BACKGROUND OF THE INVENTION

ALPR is an image-processing approach that often functions as the core module of "intelligent" transportation infrastructure applications. License plate recognition techniques, such as ALPR, can be employed to identify a vehicle by automatically reading a license plate utilizing image processing and character recognition technologies. A license plate recognition operation can be performed by locating a license plate in an image, segmenting the characters in the captured image of the plate, and performing an OCR (Optical Character Recognition) operation with respect to the characters identified.

The ALPR problem is often decomposed into a sequence of image processing operations: locating the sub-image containing the license plate (i.e., plate localization), extracting images of individual characters (i.e., segmentation), and performing optical character recognition (OCR) on these character images. In order for OCR to achieve high accuracy, it is necessary to obtain properly segmented characters.

FIG. 1, for example, illustrates a block diagram of a prior art ALPR system 10. ALPR system 10 generally includes an image capture module 12 that provides data (e.g., an image) to a license plate localization module 14. Output from module 14 is input to a character segmentation module 16, which in turn outputs data that is input to a character recognition module 18. Data output from the character recognition module 18 is provided as input to a state identification module 20.

There are a number of challenging noise sources present in license plate images captured under realistic conditions (i.e., field deployed solutions). These include: heavy shadows, non-uniform illumination (from one vehicle to the next, daytime versus nighttime, etc.), challenging optical geometries (tilt, shear, or projective distortions), plate frames and/or stickers partially touching characters, partial occlusion of characters (e.g., trailer hitch ball), poor contrast, and general image noise (e.g., salt and pepper noise). For ALPR systems deployed in the USA, for example, variations between states in character font, width, and spacing further add to the difficulty of proper character segmentation.

BRIEF SUMMARY

The following summary is provided to facilitate an understanding of some of the innovative features unique to the disclosed embodiments and is not intended to be a full description. A full appreciation of the various aspects of the embodiments disclosed herein can be gained by taking the entire specification, claims, drawings, and abstract as a whole.

It is, therefore, one aspect of the disclosed embodiments to provide for an improved ALPR method and system.

It is another aspect of the disclosed embodiments to provide for a segmentation free approach for use with an ALPR system.

It is yet another aspect of the disclosed embodiments to provide for the use of an HMM (Hidden Markov Model) for use with implementation of a segmentation free ALPR approach.

The aforementioned aspects and other objectives and advantages can now be achieved as described herein. A segmentation free method and system for automatic license plate recognition is disclosed herein with respect to example embodiments. In an example embodiment, an OCR classifier can be swept across an image of a license plate. Characters and their locations can be inferred with respect to the image of the license plate using probabilistic inference based on a Hidden Markov Model (HMM). A language model can be combined with a license plate candidate from the HMM to infer the optimal or best license plate code. The language model can be configured by employing a corpus of license plate codes, wherein the corpus includes a distribution representative of training sets and tests sets.

BRIEF DESCRIPTION OF THE DRAWINGS

The accompanying figures, in which like reference numerals refer to identical or functionally-similar elements throughout the separate views and which are incorporated in and form a part of the specification, further illustrate the present invention and, together with the detailed description of the invention, serve to explain the principles of the present invention.

FIG. 7 illustrates a schematic diagram of an HMM model for plate decoding, in accordance with an alternative embodiment;

FIG. 8 illustrates an example dynamic programming algorithm that can be implemented in accordance with an alternative embodiment;

DETAILED DESCRIPTION

The particular values and configurations discussed in these non-limiting examples can be varied and are cited merely to illustrate at least one embodiment and are not intended to limit the scope thereof.

Figure 1:
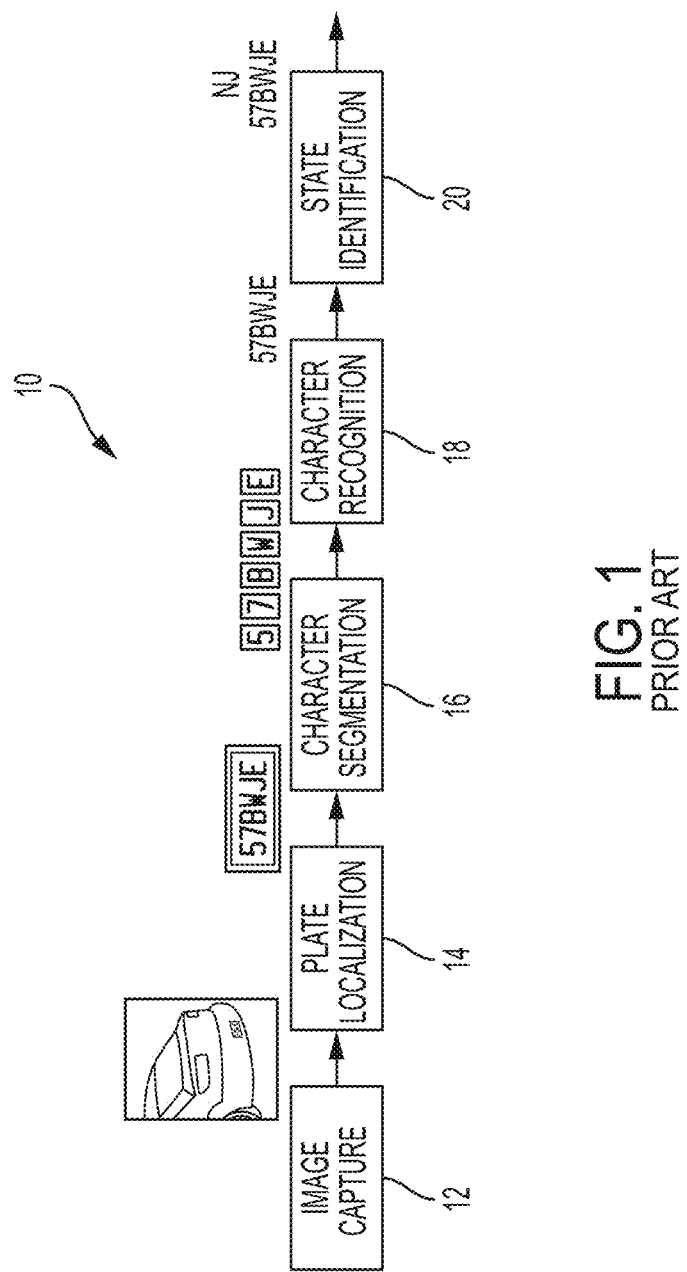
FIG. 1 illustrates a block diagram of a prior art ALPR system.
Figure 2:
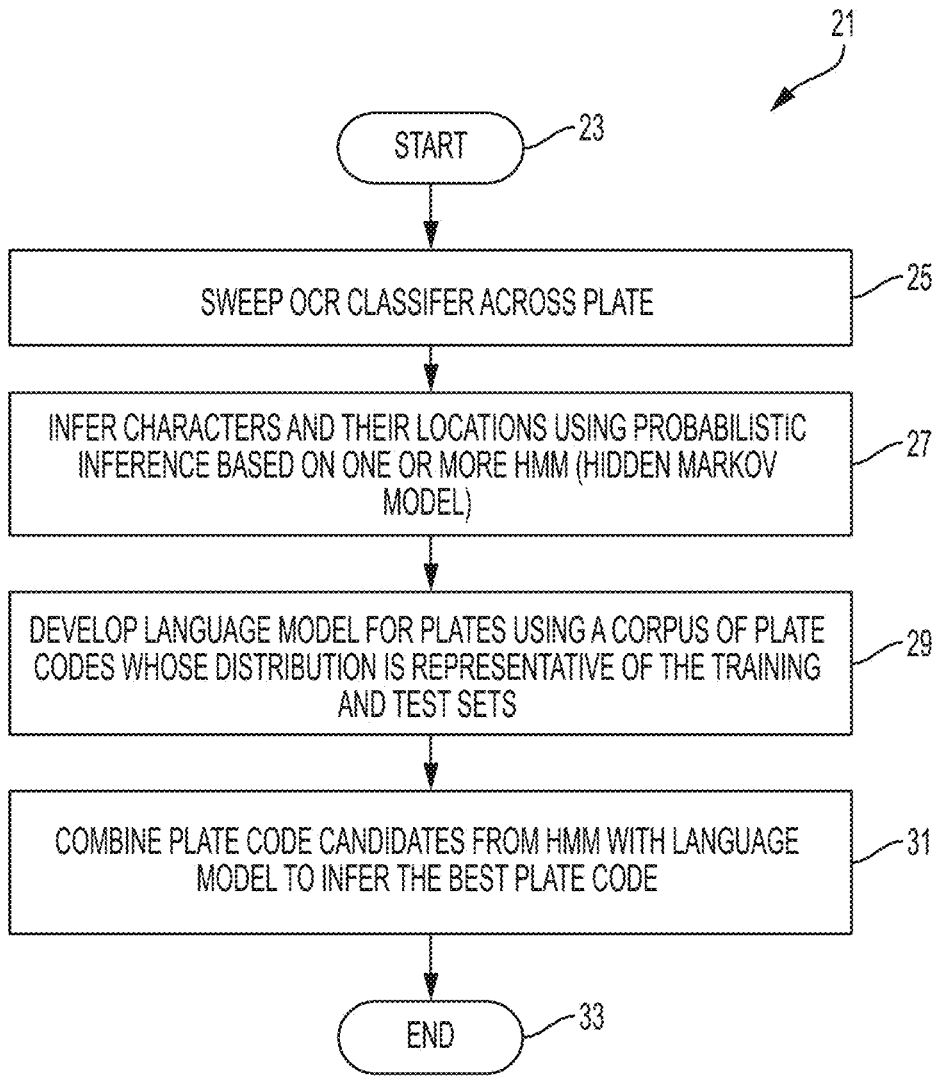
FIG. 2 illustrates a high-level flow chart of operations depicting logical operational steps of a segmentation free method that can be implemented in the context of an ALPR system, in accordance with a preferred embodiment.

FIG. 2 illustrates a high-level flow chart of operations depicting logical operational steps of a segmentation free method 21, which can be implemented in the context of an ALPR system, in accordance with a preferred embodiment. The method 21 shown in FIG. 2 avoids the character segmentation step or operation shown in FIG. 1 with respect to block 16, which is a critical but error-prone step in current license plate technologies. As depicted at block 23, the process can be initiated. Thereafter, as indicated at block 25, an operation can be implemented to sweep the OCR classifier across the plate. Then, as indicated at block 27, an operation can be implemented to infer the characters and their locations using a probabilistic inference method based on one or more HMM (Hidden Markov Model).

A language model for plates can be developed using a corpus of plate codes, whose distribution is representative of the training and test sets, as illustrated at block 29. Then, as indicated at block 31, the plate code candidates from the HMM can be combined with the language model to infer the best plate code. The process can then terminate, as shown at block 33. This methodology has been shown to outperform current approaches for actual license plate images from several different jurisdictions.

Figure 3:
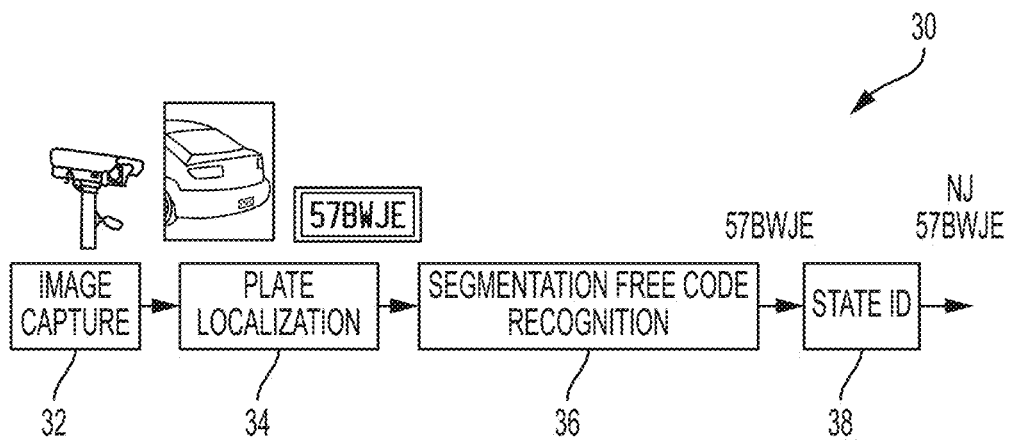
FIG. 3 illustrates a segmentation free ALPR system, which can be implemented in accordance with a preferred embodiment.

FIG. 3 illustrates a segmentation free ALPR system 30, which can be implemented in accordance with a preferred embodiment. System 30 includes an image-capturing module 32, which involves the use of a camera (e.g., an ALPR video camera) for capturing images of license plates from vehicles. Data from the image-capturing module 32 is fed as input to a plate localization module 34. Data from the plate localization module 34 is provided to a segmentation free code recognition module 36. Data from module 36 is then provided to a state identification module 38.

FIG. 3 shows the architecture of a segmentation free ALPR system. Note that two steps of the traditional ALPR, viz. Character Segmentation and Character Recognition, are replaced with a single step segmentation free code recognition module. This system has been shown to be simpler and more robust and accurate than current ALPR approaches.

Figure 4:
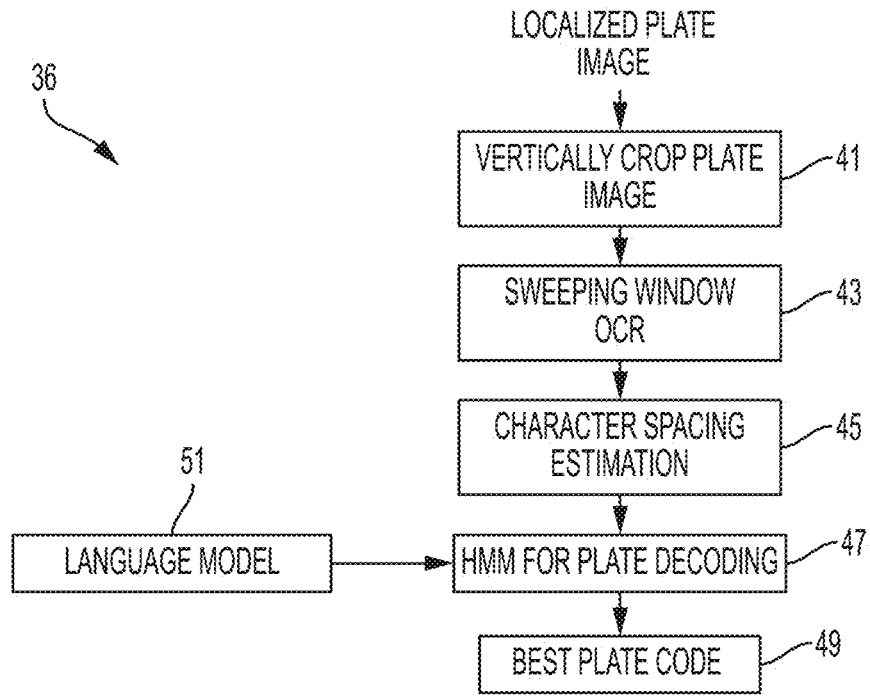
FIG. 4 illustrates a schematic diagram depicting operations of a segmentation free code recognition module depicted in FIG. 3, in accordance with a preferred embodiment.

FIG. 4 illustrates a schematic diagram depicting operations and/or modules (e.g., sub-modules) of the segmentation free code recognition module 36 depicted in FIG. 3, in accordance with a preferred embodiment. The segmentation free code recognition module 36 generally includes a vertically crop plate image module 41 that receives localized plate image data from the plate localization module 34. Data from the vertically crop plate image module 41 is provided to a sweeping window OCR module 43. Data from module 43 is then provided to a character spacing estimation module 45, which in turn outputs data as input to an HMM module 47 for plate decoding. A language model 51 processes data, which is input to the HMM module 47. The best plate code 49 is then output from the HMM module 47.

The vertically crop plate image module 41 vertically crops the localized license plate image. This operation generates a vertically copped plate image. With the sweeping window OCR module 43, a fixed window can be swept across the license plate image and an OCR applied to the image at each window location. The result is a matrix of character confidences, for each symbol in the OCR dictionary, at each window location. The vertically cropped plate image can be resized to a height of, for example, 40 pixels and a 40 pixel by 20-pixel window can be swept across it. This window size is well suited for license plates from various states and across multiple jurisdictions.

Figure 5:
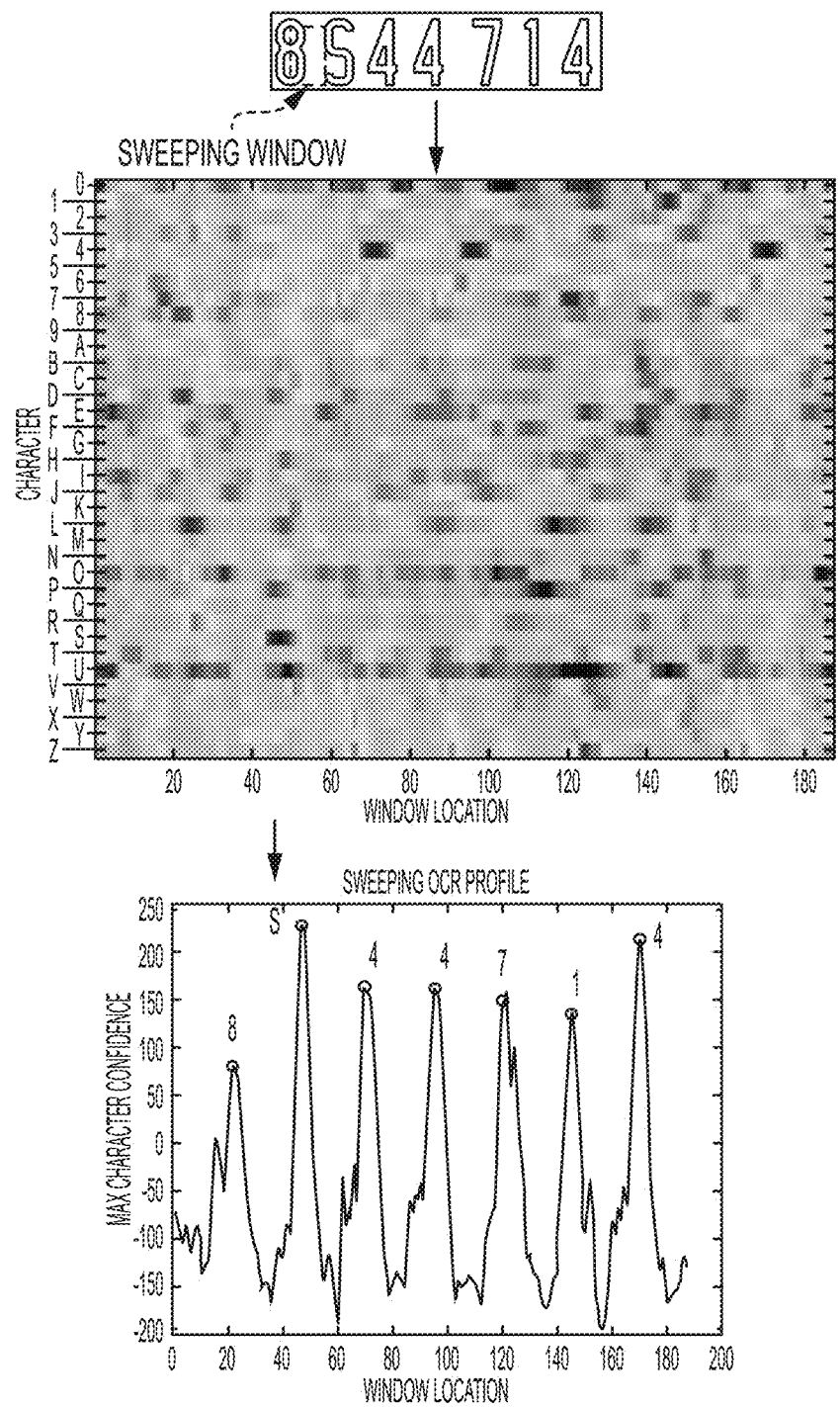
FIG. 5 illustrates a schematic diagram of a sweeping window OCR, in accordance with an alternative embodiment.

FIG. 5 illustrates the process and the results. That is, FIG. 5 depicts a schematic diagram of sweeping window OCR operations, in accordance with an alternative embodiment. The diagram depicted in FIG. 5 is divided in three sections. The first section shows a window being swept across the plate. The second section involves plotting the maximum confidence at each window location. The peaks in the third section represent the set of candidate characters in which that we are interested. To improve the signal-to-noise of this process for determining the candidate character set, the OCR can be trained to reject partial characters or in-between regions between two characters. The OCR can be trained with positive examples containing sorted segmented characters and negative examples containing logo regions and in-between character regions. A SNoW (Sparse Network of Winnows) classifier currently used for OCR operations can be employed here as well. Note that in the current ALPR systems, OCR is only trained with sorted segmented characters. It can be appreciated that the use of a SNoW classifier is not considered a limiting feature of the disclosed embodiments, but is discussed for illustrative purposes only. Other classifiers can also be employed instead of a SNoW classifier.

Figure 6:
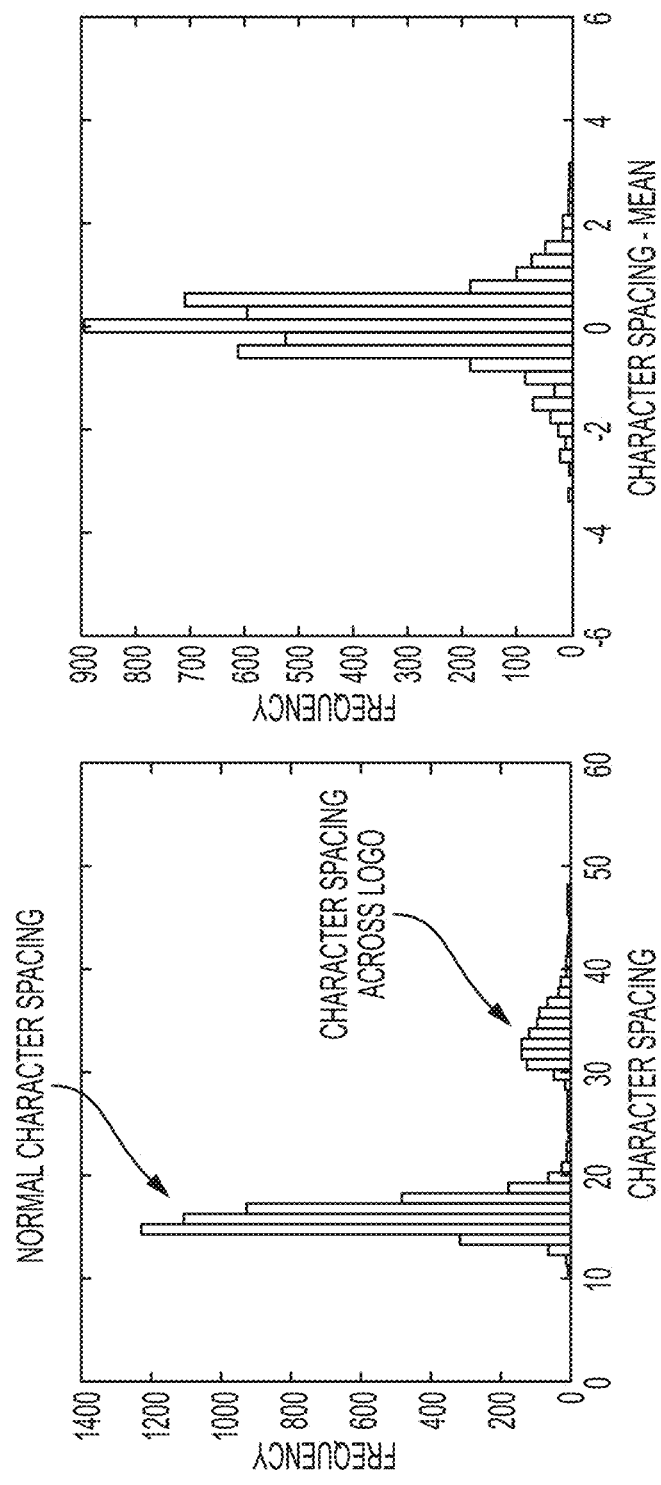
FIG. 6 illustrates a schematic diagram depicting character-to-character spacing for a sample set of 1000 MTA license plates, in accordance with an alternative embodiment.

FIG. 6 illustrates a schematic diagram depicting character-to-character spacing for a sample set of 1000 MTA license plates, in accordance with an alternative embodiment. Character-to-character spacing within a license plate is generally constant with the possible exception of characters separated by logos. FIG. 6 thus illustrates an example implementation of the character spacing estimation module 45 shown in FIG. 4, with data indicative of character-to-character spacing for the sample 1000 MTA plates. The first section of FIG. 6 is representative of bi-modal distribution, with wider spacing across the logo. The character-to-character spacing (ignoring across the logo spacing) within a plate is actually much tighter distribution such as shown in the second section with spacing typically varying no more ±2 pixels. This fact can be leveraged as an employed HMM model. The character spacing estimator estimates the median spacing(s) between the peaks of the sweeping OCR profile (e.g., see third section of FIG. 5).

FIG. 7 illustrates a schematic diagram of an example HMM model 70 for plate decoding, in accordance with an alternative embodiment. The example HMM model 70 shown in FIG. 7 is one possible HMM model that be configured and employed to implement the HMM module 47. The problem statement for plate decoding can be stated as follows: Given set S of possible characters $c_i$ at locations $x_i$ for i=1 . . . |S|, what is the highest probability sequence (i.e., plate code) that can be composed from a subset P of S? This subset selection problem can be modeled using an HMM.

FIG. 7 thus depicts a schematic of the HMM where A represents the transition matrix and O the emission matrix. $A_{j,i}$ represents the transition probability to go from character $c_j$ at $x_j$ to character $c_i$ at $x_i$. $O_i$ is the OCR probability for character $c_i$ at location $x_i$. The transition probability can be a function of the character spacing $(x_i-x_j)$, bigram $\{c_i,c_j\}$, etc. In our implementation, we modeled the transition probability purely as a function of the character spacing. A Gaussian with a flat top (A=1, |x−s|≤a and A=exp(−(x−s)²/2σ²), |x−s|>a) can be used. Here s is the median character spacing from the spacing estimator, and a and σ are parameters. Note that a=1 and σ=2 can be employed our implementation, which is roughly consistent with the observations from data (e.g., second section of FIG. 6). Thus, large deviations from the median spacing can be strongly penalized in the transition probability. One exception, however, should be noted, namely the spacing across the logo. For each probable plate code, exactly one large spacing (>minLogoSpacing) can be allowed with a transition probability=0.5.

The plate decoding problem with HMM can be summarized as follows:

$$\text{Plate} = \text{argmax}\{\Pi_{i=1}^{|P|} A(x_{j(i)}|x_{j(i-1)}) o(c_{j(i)}|x_{j(i)}) P_{LM}(c_1 \ldots |P|)\}$$

The Language model assigns a probability to the plate code based on prior data of actual license plate codes. The language model is a Naïve Bayes classifier based on two features: MOSCount, codeLength. The MOSCount is a number of times the code template (e.g., LLLNNNN letter/number combination) with starting character has been seen in the training data. In order to account for codes rarely seen in the training data, we allow a longer code with good code probability to override the language model. The intuition behind this is that we trust the visual evidence (i.e., code probability) more than prior probability when determining which plate code is more likely. The decoding algorithm uses dynamic programming.

FIG. 8 illustrates an example Viterbi (dynamic programming) algorithm 72 that can be implemented in accordance with an alternative embodiment. A Viterbi algorithm is a dynamic programming algorithm that can be employed for determining a most likely sequence of hidden states (referred to as the "Viterbi path") and which results in a sequence of observed events, particularly in the context of Markov information sources such as an HMM. It can be appreciated that the algorithm 72 shown in FIG. 8 is presented for illustrative purposes only and is not considered a limiting feature of the disclosed embodiments. That is, other types of dynamic programming algorithms can be employed for optimization purposes.

The operations provided by modules 43 and 45 depicted in FIG. 4 with respect to the segmentation free code recognition operation or module 36 can be repeated for each state with its corresponding trained OCR classifier, and the highest probability plate code among all states can be then sent to, for example, the state identification module 38 shown in FIG. 3, for a final determination of the state ID.

Figure 9:
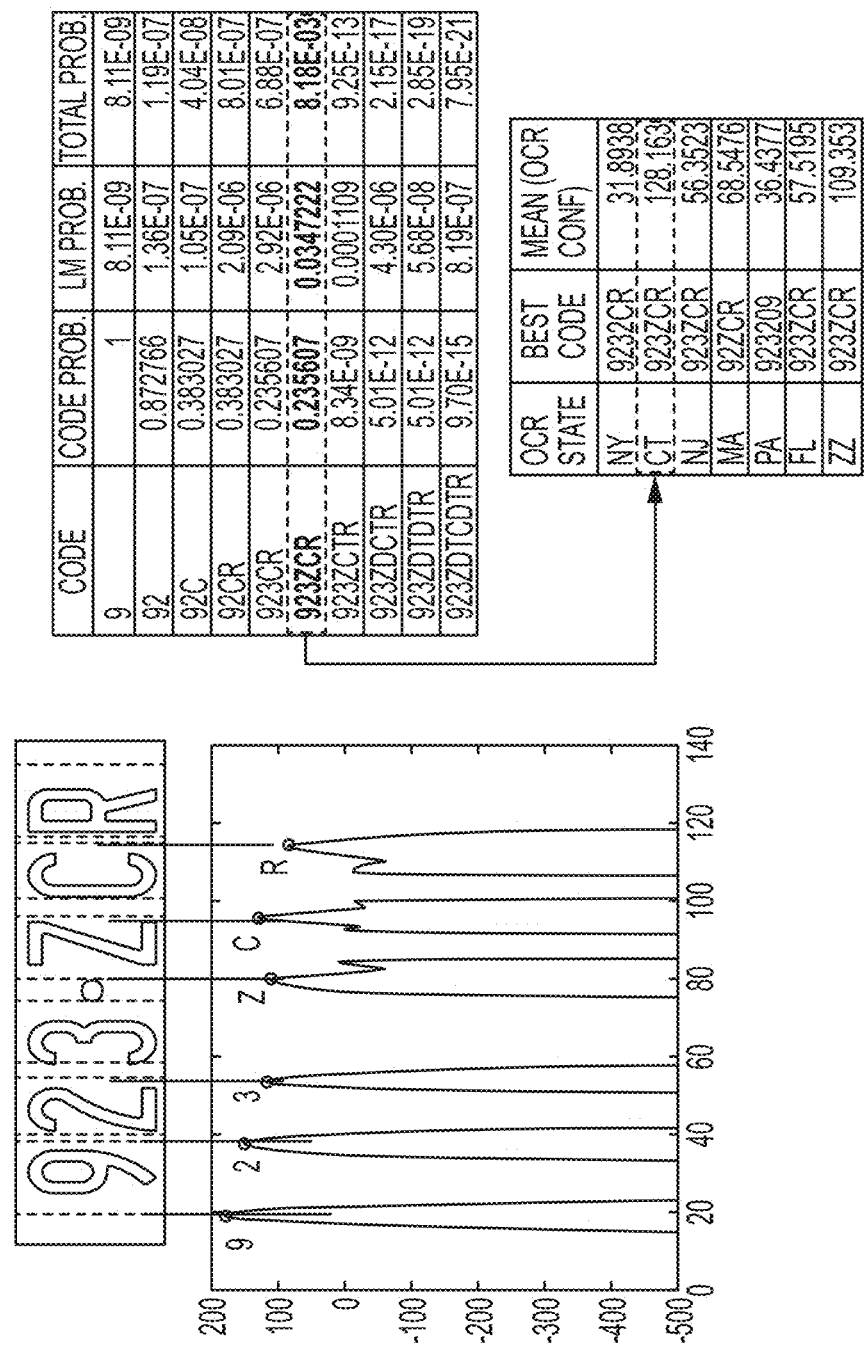
FIG. 9 illustrates an example of HMM decoding, which may be adapted for use in accordance with an alternative embodiment.
Figure 10:
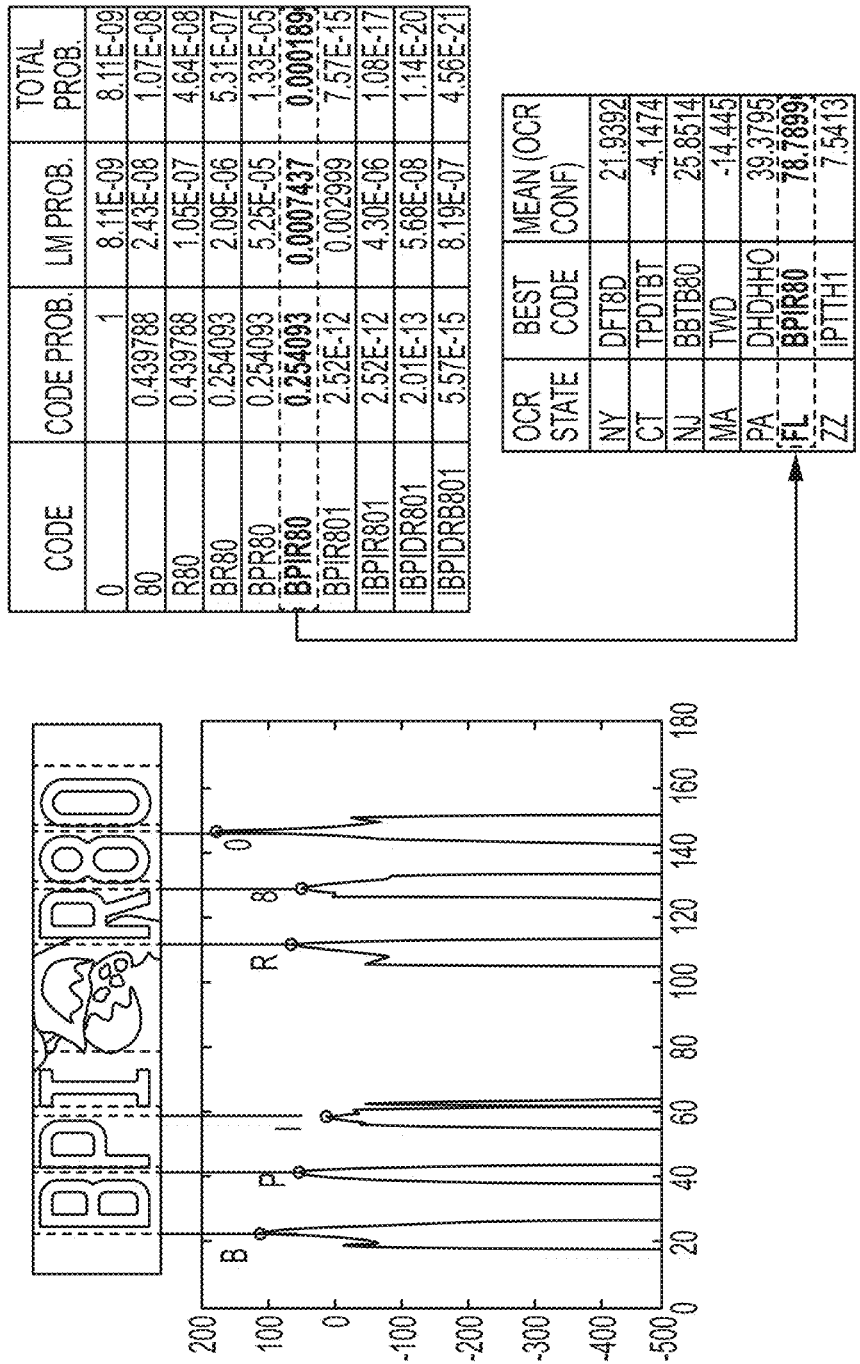
FIG. 10 illustrates another example of HMM decoding, which may be adapted for use in accordance with an alternative embodiment.

FIGS. 9 and 10 show two examples of HMM decoding. FIG. 9 illustrates an example of HMM decoding, which may be adapted for use in accordance with an alternative embodiment. FIG. 10 illustrates another example of HMM decoding, which may be adapted for use in accordance with an alternative embodiment. In both these examples, the conclusion is incorrect at high confidence (which implies that these plates will not be sent for human review and will be incorrect) while the segmentation-free approach obtains the correct code.

Figure 11:
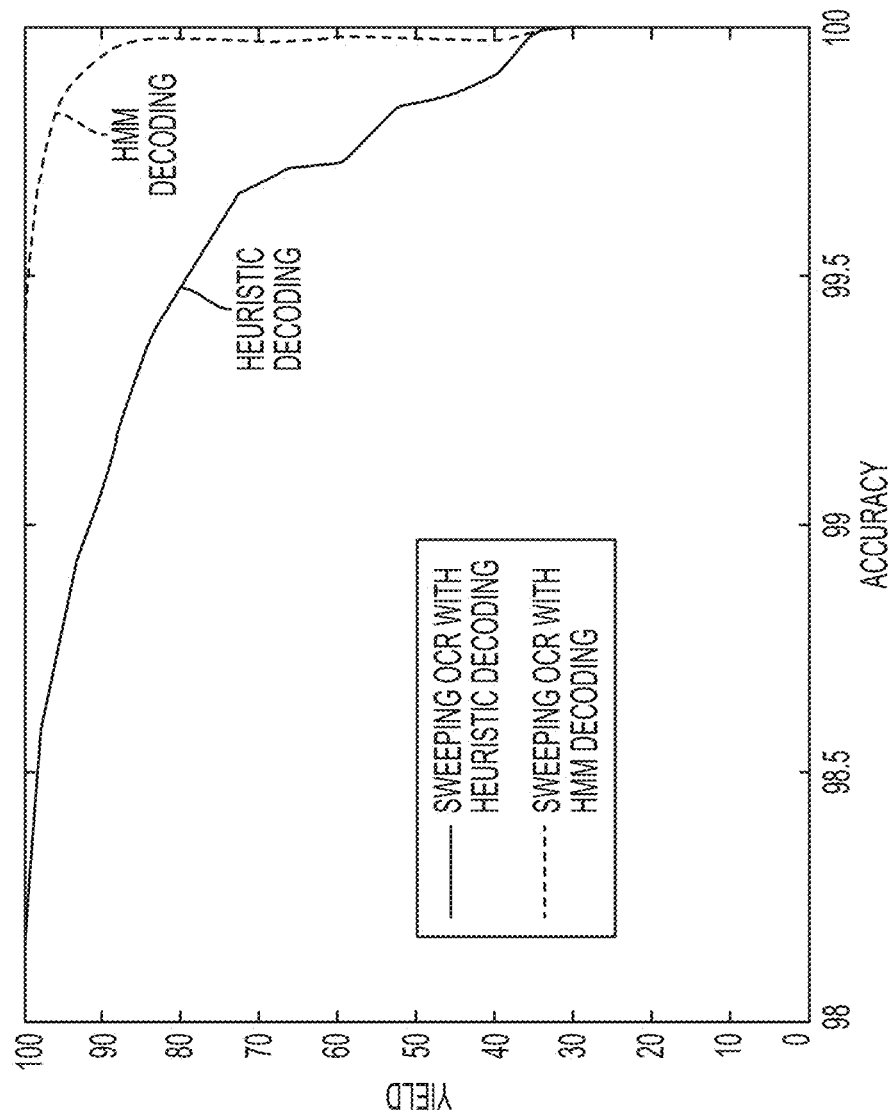
FIG. 11 illustrates a graph depicting data indicative of sweeping OCR with heuristic and HMM decoding, in accordance with an alternative embodiment.

FIG. 11 illustrates a graph depicting data indicative of sweeping OCR with heuristic and HMM decoding, in accordance with an alternative embodiment. In FIG. 11, a comparison of an HMM based approach for plate decoding approach is compared with a heuristic approach on a sample of 24000 synthetic license plates. The heuristic approach is based on (a) applying a character/no-character classifier on the vertically cropped plate image to find character regions; and (b) finding peaks in the sweeping OCR profile that are separated by distance>minDistance and confidence>minConf. As is evidenced by FIG. 9, the HMM approach vastly outperforms the heuristic approach. The yield for the HMM approach is above 99% at 99.5% accuracy. Sample HMM decoding data is indicated by a dotted line while heuristic decoding data is indicated by a solid line in the graph of FIG. 11.

Figure 12:
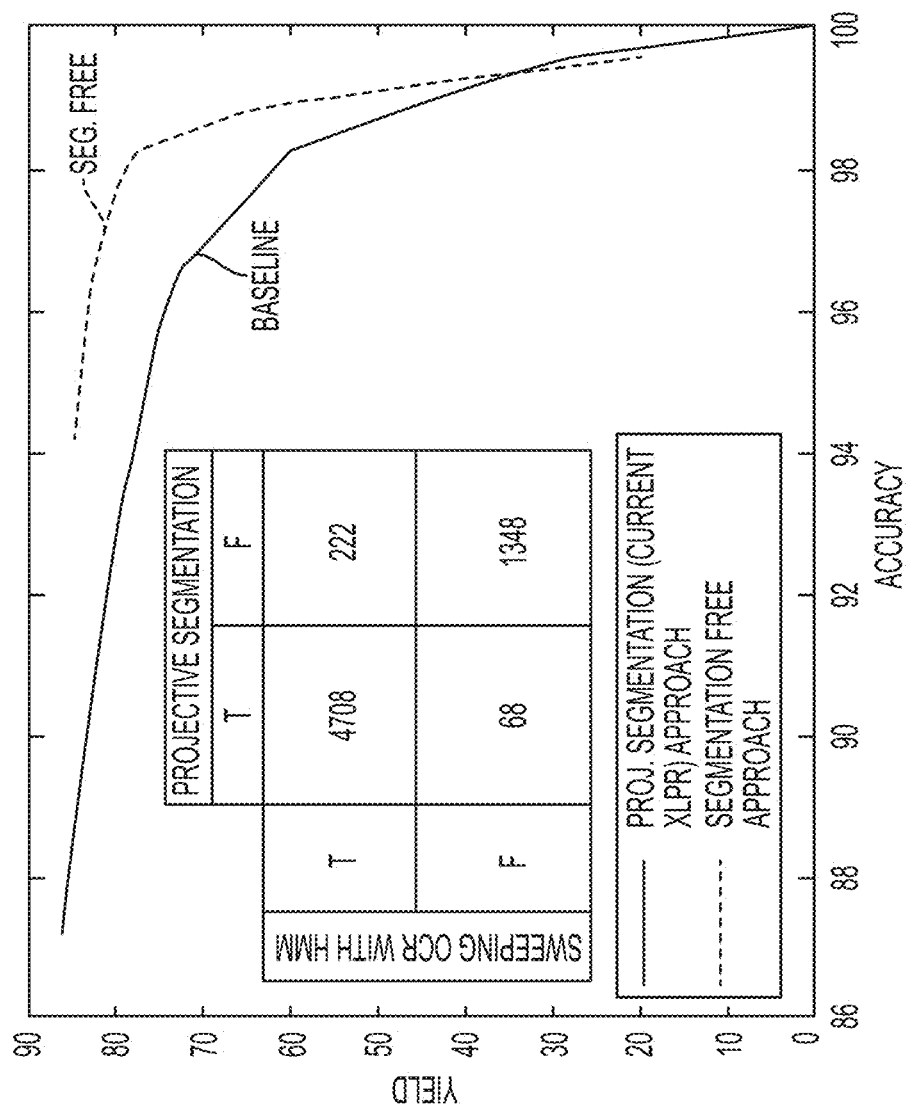
FIG. 12 illustrates a graph depicting ROC comparison data, in accordance with an alternative embodiment.

FIG. 12 illustrates a graph depicting ROC comparison data, in accordance with an alternative embodiment. FIG. 12 shows a comparison of performance between current baseline data using projective segmentation and the segmentation-free approach described herein with respect to a sample set of data. Again we observe significant boost in performance: 15-20% increase in yield at 99% accuracy. It can be observed via the data shown in the table that 222 plates are incorrect with codes via current systems, but correct via the segmentation free approach. The example data shown in the table also indicates that 68 plates were correctly coded by current ALPR, but were incorrectly coded by the segmentation free approach. The solid line in the graph plots data with respect to the current approaches used, while data associated with the segmentation free approach is indicated by a dotted line.

Figure 13:
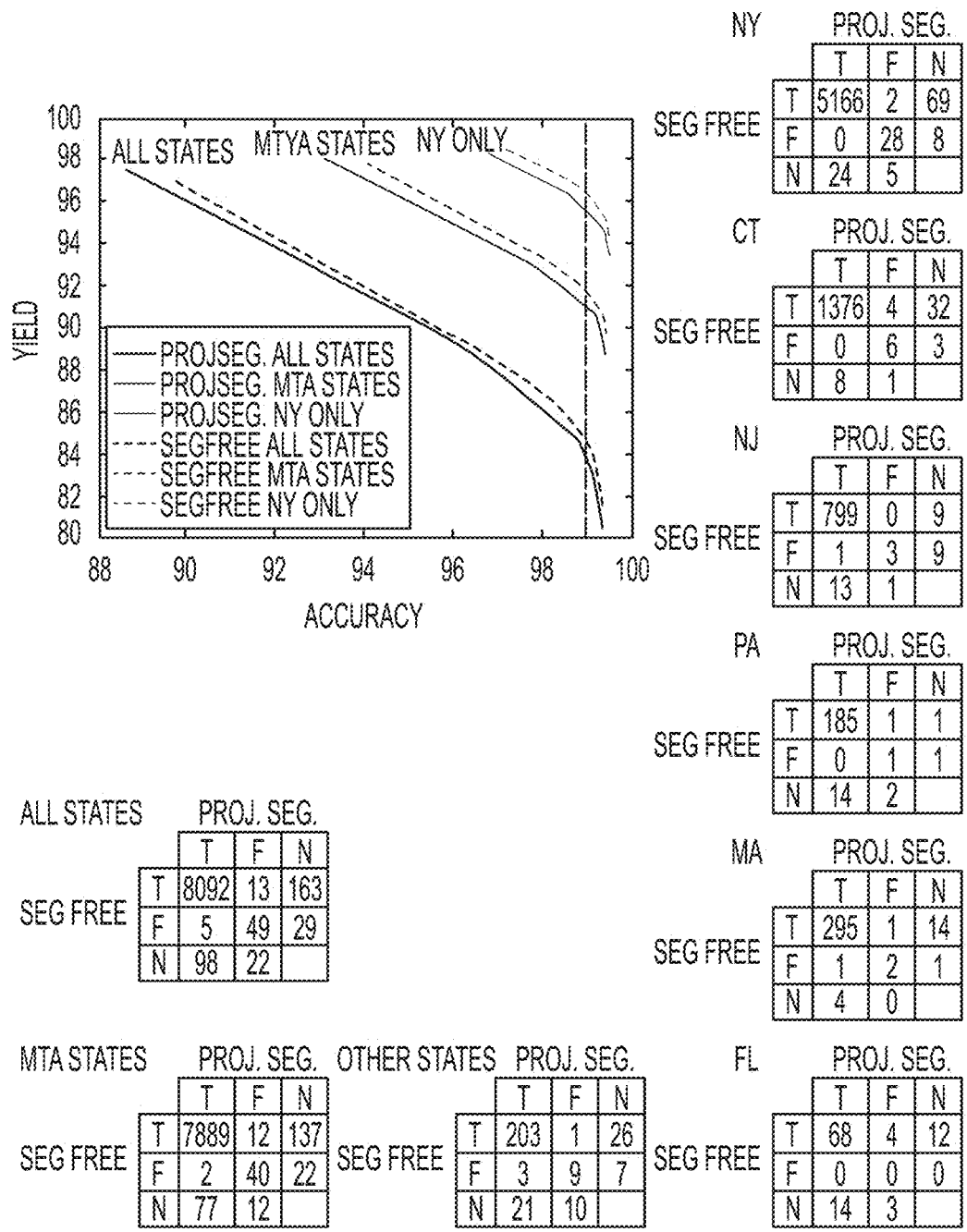
FIG. 13 illustrates a graph and tables indicative of ROC comparison for an MTA data set, in accordance with an alternative embodiment.

FIG. 13 illustrates a graph and associated tables indicative of ROC comparison for an MTA data set, in accordance with an alternative embodiment. Again the disclosed segmentation free approach outperforms current baseline ALPR data, with an increase in yield of 1-2% at 99% accuracy.

The embodiments are described at least in part herein with reference to flowchart illustrations and/or block diagrams of methods, systems, and computer program products and data structures according to embodiments of the invention. It will be understood that each block of the illustrations, and combinations of blocks, can be implemented by computer program instructions. These computer program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the block or blocks.

Figure 14:
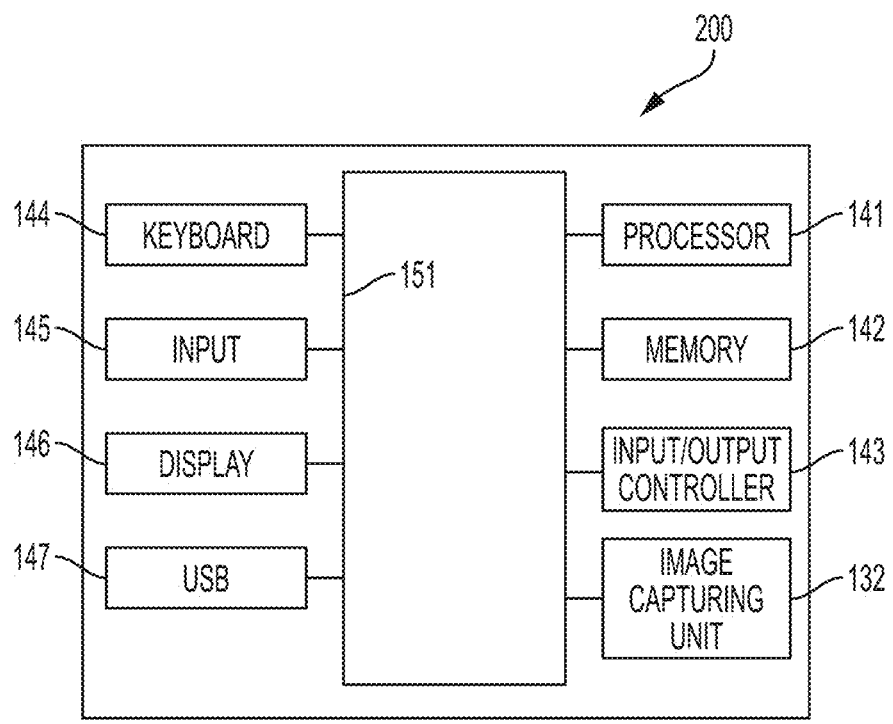
FIG. 14 illustrates a schematic view of a computer system, in accordance with an embodiment.
Figure 15:
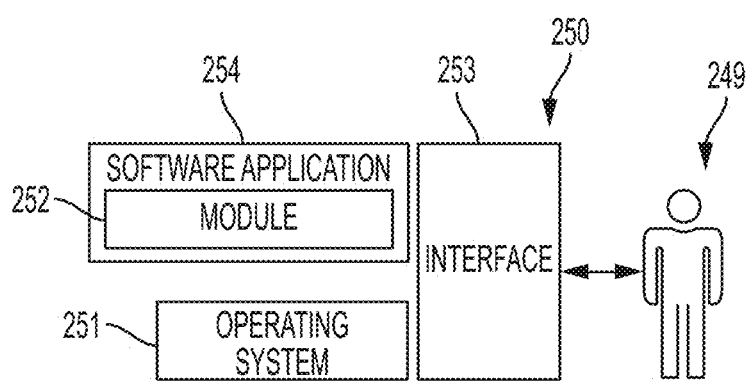
FIG. 15 illustrates a schematic view of a software system including a module, an operating system, and a user interface, in accordance with an embodiment.

FIGS. 14-15 are provided as exemplary diagrams of data-processing environments in which embodiments of the present invention may be implemented. It should be appreciated that FIGS. 14-15 are only exemplary and are not intended to assert or imply any limitation with regard to the environments in which aspects or embodiments of the disclosed embodiments may be implemented. Many modifications to the depicted environments may be made without departing from the spirit and scope of the disclosed embodiments.

As illustrated in FIG. 14, some embodiments may be implemented in the context of a data-processing system 200 that includes, for example, a processor 141, a memory 142, an input/output controller 143, an image capturing unit or camera(s) 132 (e.g., ALPR video camera), a keyboard 144, an input device 145 (e.g., a pointing device, such as a mouse, track ball, and pen device, etc.), a display 146, and a USB (Universal Serial Bus) peripheral connection 147. As illustrated, the various components of data-processing system 200 can communicate electronically through a system bus 151 or similar architecture. The system bus 151 may be, for example, a subsystem that transfers data between, for example, computer components within data-processing system 200 or to and from other data-processing devices, components, computers, etc.

FIG. 15 illustrates a computer software system 250 for directing the operation of the data-processing system 200 depicted in FIG. 14. Software application 254, stored for example in memory 142, generally includes a kernel or operating system 251 and a shell or interface 253. One or more application programs, such as software application 254, may be "loaded" (i.e., transferred from, for example, a mass storage or other memory location into the memory 142) for execution by the data-processing system 200. The data-processing system 200 can receive user commands and data through an interface 253; these inputs may then be acted upon by the data-processing system 200 in accordance with instructions from operating system 251 and/or software application 254. The interface 253 in some embodiments can serve to display results, whereupon a user may supply additional inputs or terminate a session. The software application 254 can include a module 252 that can implement instructions or logical operations such as those shown in, for example, in FIGS. 3-4 and other diagrams described and illustrated herein.

The following discussion is intended to provide a brief, general description of suitable computing environments in which the system and method may be implemented. Although not required, the disclosed embodiments will be described in the general context of computer-executable instructions, such as program modules, being executed by a single computer. In most instances, a "module" constitutes a software application.

Generally, program modules include, but are not limited to, routines, subroutines, software applications, programs, objects, components, data structures, etc., that perform particular tasks or implement particular abstract data types and instructions. Moreover, those skilled in the art will appreciate that the disclosed method and system may be practiced with other computer system configurations, such as, for example, hand-held devices, multi-processor systems, data networks, microprocessor-based or programmable consumer electronics, networked PCs, minicomputers, mainframe computers, servers, and the like.

Note that the term module as utilized herein may refer to a collection of routines and data structures that perform a particular task or implements a particular abstract data type. Modules may be composed of two parts: an interface, which lists the constants, data types, variable, and routines that can be accessed by other modules or routines; and an implementation, which is typically private (accessible only to that module) and which includes source code that actually implements the routines in the module. The term module may also simply refer to an application, such as a computer program designed to assist in the performance of a specific task, such as word processing, accounting, inventory management, etc. The module 252 shown in FIG. 15 can thus implement instructions such as those shown in, for example, FIGS. 3-4 herein.

FIGS. 14-15 are intended as examples and not as architectural limitations of disclosed embodiments. Additionally, such embodiments are not limited to any particular application or computing or data processing environment. Instead, those skilled in the art will appreciate that the disclosed approach may be advantageously applied to a variety of systems and application software. Moreover, the disclosed embodiments can be embodied on a variety of different computing platforms, including Macintosh, UNIX, LINUX, and the like.

Figure 16:
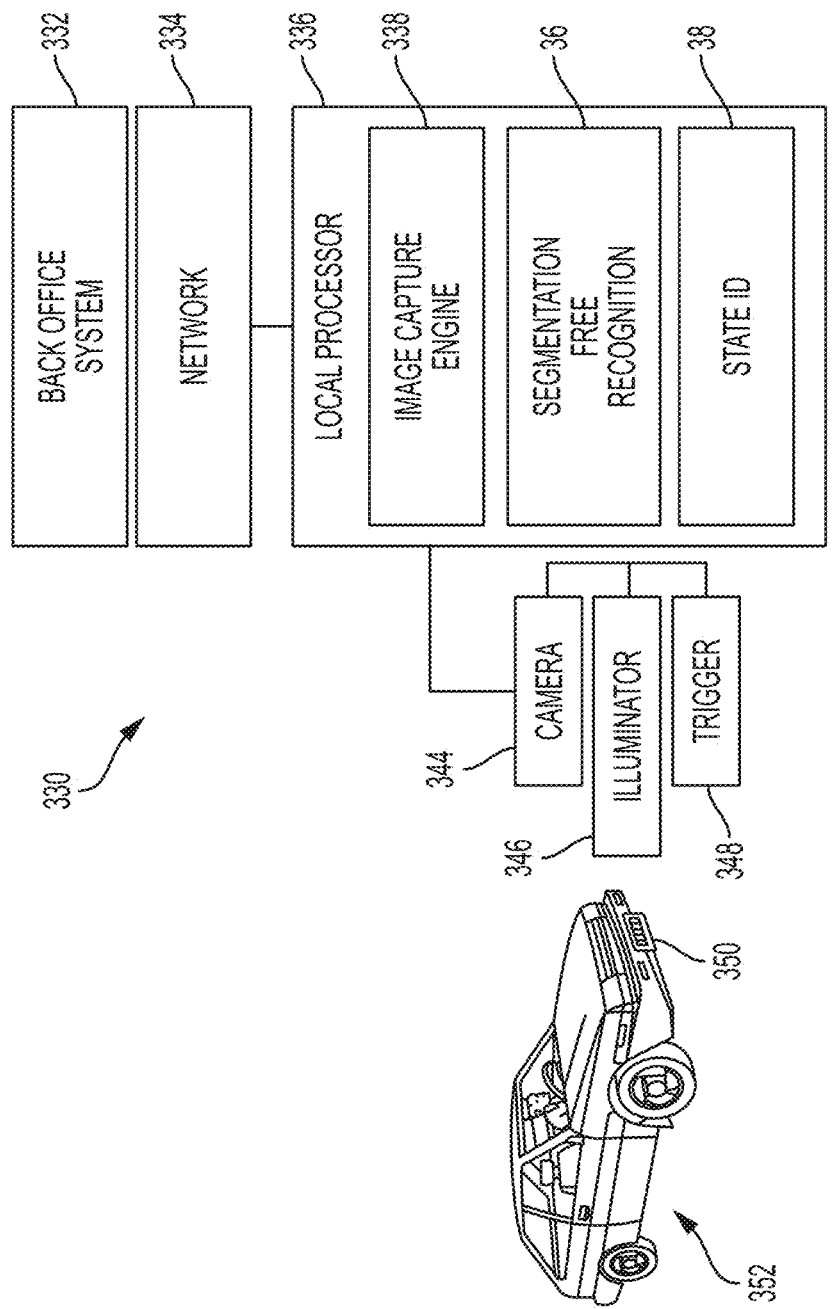
FIG. 16 illustrates a high-level system diagram of an ALPR system, which can be implemented in accordance with an alternative embodiment.

FIG. 16 illustrates a high-level system diagram of an ALPR system 330, which can be implemented in accordance with an alternative embodiment. The system 330 depicted in FIG. 16 generally includes or can be used in association with a vehicle 352 having a license plate 350. That is, the ALPR system 330 can be used to capture an image of the license plate 350 and subject the license plate image to the various segmentation free ALPR operations discussed herein.

System 330 includes a trigger 348, a camera 344 (e.g., an ALPR camera), and an illuminator 346 for capturing an image. System 330 further includes a local processor 336 that includes an image capture engine 338, the same segmentation free code recognition module 36 shown in FIGS. 3-4, and the state identification module 38 also depicted in FIG. 3. System 330 can further include a network 334 (e.g., a local wireless network, the Internet, cellular communications network, other data network, etc.) and a back office system 332 for processing transactions and managing, for example, accounts. The local processor 336 can communicate with the back office system 332 via the network 334.

In FIG. 16, the license plate 350 is depicted located on the front of the vehicle 352, but the license plate 350 could also be located on the rear of the vehicle 352 as well. Some states (e.g., Texas) require license plates in both places, i.e., at the rear and front of a vehicle. In one scenario, the vehicle 352 enters a license plate reading zone which contains a trigger device 348 which controls an illuminator 346 which illuminates the license plate region of the vehicle 352, and the camera 344 which captures images of the license plate 350 on the vehicle 352. The camera 344 can be connected to and/or communicate with the local processor unit 336.

The image capture engine 338 controls the trigger 348, illuminator 346, and camera 344 in order to properly image the vehicle 352 and the license plate 350. An image of the license plate 350 and character segmentation free data thereof can then be processed via local processor 336 and transmitted over the network 334 to the back office system 332. The back office system 332 can process the license plate and state jurisdiction data and can assess a toll or otherwise interact with an account or take other transportation application specific actions.

Based on the foregoing, it can be appreciated that a number of example embodiments, preferred and alternative, are disclosed herein. For example, in one embodiment, a method for segmentation free license plate recognition can be implemented. Such a method or process can include, for example, the steps of logical operations of sweeping an OCR classifier across an image of a license plate, inferring characters and their locations with respect to the image of the license plate using probabilistic inference based on at least one Hidden Markov Model (HMM), and combining a language model with at least one license plate candidate from the HMM to infer an optimal license plate code. In some example embodiments, a step or operation can be implemented for configuring the language model by employing a corpus of license plate codes, the corpus having a distribution representative of training sets and tests sets.

In another embodiment, a step or operation can be provided for capturing the image of the license plate with an image-capturing unit. In yet another embodiment, a step or operation can be implemented for performing a plate localization of the image of the license plate after capturing the image of the license plate. In still another embodiment, a step or operation can be provided for vertically cropping the image of the license plate prior to sweeping the OCR classifier across the image of the license plate.

In another embodiment, the step or operation of inferring characters and their locations with respect to the image of the license plate can further involve a step or operation of performing a character spacing estimation with respect to the characters.

In another embodiment, a system for segmentation free license plate recognition can be implemented. Such a system can include, for example, one or more processors and a non-transitory computer-usable medium embodying computer program code, wherein the computer-usable medium is capable of communicating with the processor(s). The computer program code includes instructions executable by the processor(s) and configured, for example, for sweeping an OCR classifier across an image of a license plate, inferring characters and their locations with respect to the image of the license plate using probabilistic inference based on at least one Hidden Markov Model (HMM), and combining a language model with at least one license plate candidate from the HMM to infer an optimal license plate code.

In some embodiments, the aforementioned instructions can be further implemented for configuring the language model by employing a corpus of license plate codes, the corpus having a distribution representative of training sets and tests sets. In another embodiment, an image-capturing unit can be provided, wherein the image of the license plate is captured with the image-capturing unit and wherein the image-capturing unit communicates with the processor(s).

In another embodiment, the aforementioned instructions can be further configured for performing a plate localization of the image of the license plate after capturing the image of the license plate via the image-capturing unit. In yet another embodiment, the aforementioned instructions can be further configured for vertically cropping the image of the license plate prior to sweeping the OCR classifier across the image of the license plate.

In another embodiment, the instructions for inferring characters and their locations with respect to the image of the license plate can further include instructions configured for performing a character spacing estimation with respect to the characters.

In still another embodiment, a system for segmentation free license plate recognition can include, for example, an image-capturing unit that captures an image of a license plate, and an OCR classifier, wherein the OCR classifier is swept across the image of the license plate. Such a system can further include a Hidden Markov Model (HMM) wherein characters and their locations with respect to the image of the license plate are inferred using probabilistic inference based on the HMM; and a language model that is combined with at least one license plate candidate from the HMM to infer an optimal license plate code. In some embodiments, the language mode can be configured by employing a corpus of license plate codes, the corpus having a distribution representative of training sets and tests sets. In yet another embodiment, plate localization of the image of the license plate can be performed after capturing the image of the license plate. In still another embodiment, the image of the license plate prior can be vertically cropped prior to sweeping the OCR classifier across the image of the license plate.

It will be appreciated that variations of the above-disclosed and other features and functions, or alternatives thereof, may be desirably combined into many other different systems or applications. It will also be appreciated, that various presently unforeseen or unanticipated alternatives, modifications, variations or improvements therein may be subsequently made by those skilled in the art, which are also intended to be encompassed by the following claims.

The invention claimed is:

1. A method for segmentation free license plate recognition, said method comprising:
    sweeping an OCR classifier across an image of a license plate;
    inferring characters and their locations with respect to said image of said license plate using probabilistic inference based on at least one Hidden Markov Model (HMM);
    combining a language model comprising a Naïve Bayes classifier using a MOSCount feature and a codeLength feature, with at least one license plate candidate from said at least one HMM to infer an optimal license plate code; and
    identifying a state of origin for said license olate according to said optimal license plate code.

2. The method of claim 1 further comprising configuring said language model by employing a corpus of license plate codes, said corpus having a distribution representative of training sets and tests sets.

3. The method of claim 1 further comprising capturing said image of said license plate with an image-capturing unit.

4. The method of claim 1 further comprising performing a plate localization of said image of said license plate after capturing said image of said license plate.

5. The method of claim 1 further comprising vertically cropping said image of said license plate prior to sweeping said OCR classifier across said image of said license plate.

6. The method of claim 1 wherein inferring characters and their locations with respect to said image of said license plate, further comprises:
    performing a character spacing estimation with respect to said characters.

7. The method of claim 6 further comprising vertically cropping said image of said license plate prior to sweeping said OCR classifier across said image of said license plate.

8. The method of claim 6 further comprising performing a plate localization of said image of said license plate after capturing said image of said license plate.

9. A system for segmentation free license plate recognition, said system comprising:
    at least one processor; and
    a computer-usable medium embodying computer program code, said computer-usable medium capable of communicating with said at least one processor, said computer program code comprising instructions executable by said at least one processor and configured for:
    sweeping an OCR classifier across an image of a license plate;
    inferring characters and their locations with respect to said image of said license plate using probabilistic inference based on at least one Hidden Markov Model (HMM);
    combining a language model comprising a Naïve Bayes classifier using a MOSCount feature and a codeLength feature, with at least one license plate candidate from said at least one HMM to infer an optimal license plate code; and identifying a state of origin for said license olate according to said optimal license plate code.

10. The system of claim 9 wherein said instructions are further provided for configuring said language model by employing a corpus of license plate codes, said corpus having a distribution representative of training sets and tests sets.

11. The system of claim 9 further comprising an image-capturing unit, wherein said image of said license plate is captured with an image-capturing unit and wherein said image-capturing unit communicates with said at least one processor.

12. The system of claim 11 wherein said instructions are further configured for performing a plate localization of said image of said license plate after capturing said image of said license plate via said image-capturing unit.

13. The system of claim 9 wherein said instructions are further configured for vertically cropping said image of said license plate prior to sweeping said OCR classifier across said image of said license plate.

14. The system of claim 9 wherein said instructions for inferring characters and their locations with respect to said image of said license plate, further comprise instructions configured for performing a character spacing estimation with respect to said characters.

15. The system of claim 11 wherein said instructions are further configured for vertically cropping said image of said license plate prior to sweeping said OCR classifier across said image of said license plate.

16. The system of claim 15 wherein said instructions for inferring characters and their locations with respect to said image of said license plate, further comprise instructions configured for performing a character spacing estimation with respect to said characters.

17. A system for segmentation free license plate recognition, said system comprising:

an image-capturing unit that captures an image of a license plate;

an OCR classifier, wherein said OCR classifier is swept across said image of said license plate;

at least one Hidden Markov Model (HMM) wherein characters and their locations with respect to said image of said license plate are inferred using probabilistic inference based on said at least one HMM;

a language model comprising a Naïve Bayes classifier using a MOSCount feature and a codeLength feature, that is combined with at least one license plate candidate from said at least one HMM to infer an optimal license plate code; and a state identification module that identifies a state of origin for said license olate according to said optimal license plate code.

18. The system of claim 17 wherein said language mode is configured by employing a corpus of license plate codes, said corpus having a distribution representative of training sets and tests sets.

19. The system of claim 17 wherein a plate localization of said image of said license plate is performed after capturing said image of said license plate.

20. The system of claim 17 wherein said image of said license plate prior is vertically cropped prior to sweeping said OCR classifier across said image of said license plate.

* * * * *